Patented Dec. 17, 1940

2,225,009

UNITED STATES PATENT OFFICE 2,225,009

METHOD OF BONDING FIBER GLASS WITH CARBON

James Franklin Hyde, Corning, N. Y., assignor, by mesne assignments, to Owens-Corning Fiberglas Corporation, Toledo, Ohio, a corporation of Delaware No Drawing. Application August 25, 1937, Serial No. 160,937

2 Claims. (Cl. 91—70)

This invention relates to a process for bonding artificial mineral fibers and the novel articles which may be produced thereby.

With the perfection of processes by which silicious materials can be formed into long and very fine fibers, a new material became available having tremendous possibilities. These fibers have achieved wide acceptance as a material for thermal insulation when loosely matted together. Arranged in different manners, they have been used as a filtering medium for a variety of liquids and gases. Some attempts have been made to bond these fibers together to form more rigid bodies capable of sustaining their own weight and maintaining a predetermined form without confinement. Various binders have been tried including all of the organic adhesives and such inorganic substances as sodium silicate and a number of clays. All of these materials have certain unburnt disadvantages. The organic materials are undesirable since they are subject to attack by acids and alkalies and limit the use of the composite material to relatively low temperatures, seldom over 150° C. This seriously impairs the effectiveness of the material since one of the important characteristics of silicate fibers is their ability to withstand high temperatures. While the inorganic substances will generally withstand higher temperatures than organic adhesives, they are for the most part heavy, slow drying, often subject to chemical attack and costly to apply due to the length of drying involved.

The primary object of my invention is to bond silicate fibers in such a manner that the resultant product is light in weight, capable of withstanding moderately high temperatures and will be relatively inert to the action of acids and alkalies.

Another object is to produce a relatively strong light weight material and porosity of which may be so regulated to render it suitable for use as an insulating material or a filtering medium capable of withstanding the action of acids and of removing both solids and noxious gases from a fluid passing through it.

It has been discovered that many organic adhesives, when applied as a bonding medium to silicate fibers can be heated in the absence of oxygen until they have been reduced to pure carbon without entirely losing their adhesive properties. This effect is not easily explained but has been found to exist with a large variety of bonding substances which include carbon as one of their chemical constituents.

To obtain the desired results, it is advantageous to apply the adhesive material to the silicate fibers in the form of a solution. In this manner, a thin layer of adhesive is formed about the surface of each fiber and a good bond is obtained at each point of contact between individual fibers. After the desired article has been formed and the solvent removed by drying, the article is heated in a closed box in the substantial absence of oxygen to a temperature sufficient to drive off all combined water and other volatiles. After the evolution of gases has ceased, it is found that a carbonaceous deposit exists throughout the mass, each fiber having its individual film of carbon. When created in this manner the carbon appears to adhere very tenaciously to the surface of the fibers and bond well to other particles of carbon. The resultant article has surprising toughness and will support a far greater weight than the mass of fibers alone.

The advantages of such a bond are numerous. Pure carbon formed in this manner does not oxidize rapidly until raised to relatively high temperatures. In fact, such a carbon bond has been found to be practically fireproof, for while the material will char at red heat it will not flame. The fireproof qualities of the bond may be improved by the addition of one of the customary combustion inhibiting agents such as ammonium phosphate. Thus it is possible to utilize the carbon bond under extreme temperature conditions where the common organic bonds would be wholly unsuitable. Since only the carbon constituent of the original material remains after the heat treatment, it is obvious that an extremely light weight bond is produced.

Of even greater importance than either of the previously mentioned qualities is resistance of the carbon bond to chemical attack. One of the important advantages of silicate fibers, particularly glass, as a filtering medium is the fact that they will withstand long exposure to acid fluids and fumes without deterioration. Heretofore in the construction of filters of fiber glass, it has been difficult to obtain a bond as inert to chemical reaction as the glass. Since carbon produced as above described is inert to both acids and alkalies and is subject to oxidation only at relatively high temperatures, a bonding material for glass fibers becomes available which is even more inert in some respects than the glass itself.

Not only is a new and superior bond for silicate fibers produced by this invention, but numerous uses have been discovered in which the carbon becomes the active agent and the silicate fibers merely constitute a support for the carbon. It is well known that finely divided carbon may have the power to absorb enormous volumes of noxious gases. A mass of silicate fibers bonded together with carbon, as above described, presents such an enormous surface area for the amount of carbon involved as to constitute an unusually good filtering medium for the removal of offensive odors and poisonous gases from the atmosphere. Bodies of this bonded material arranged as filters in an air conducting system tend to remove not only physical pollution, such as dust and lint but also gaseous pollution thus constituting a filter medium of unusual efficiency. Similarly when finely divided carbon is used as a catalytic agent in chemical reactions, a mass of carbon bonded silicate fibers presents the carbon in a readily available and highly efficient form.

The one essential prerequisite for the formation of such a carbon bond is the presence in the initial binder of an organic material which can be treated under special conditions to form a carbonaceous residue. Such materials include the carbohydrates, starches, oils, waxes and resins. Of these the carbohydrates are preferred since they are transformed into carbon largely by dehydration. However, with proper care the other substances can be used advantageously. A fair degree of success has been achieved using very finely powdered soft coal. In this case, the material contains sufficient volatiles of the proper nature to effect a fairly thorough coating of the fibers, although the material is introduced without a solvent vehicle. Furthermore, the residue need not be confined entirely to carbon to produce a bond of this general nature. Many inorganic derivations of organic materials can be made to char in place such as calcium stearate and other metallic soaps. Mixing of the materials may be accomplished by soaking the finished article in a solution of the adhesive, by spraying the article as it is fabricated or by mechanical mixing according to the requirements of each individual situation. Carbonization may take place in a closed container, or as a continuous process so long as substantially all oxygen is excluded while the article remains at the carbonization temperature. Experiments have taught that a temperature of from 300° to 350° C. is satisfactory, but that the carbonization temperature is not critical and may be varied to a considerable extent without modification of the finished product.

By incorporating a variety of additional agents in the adhesive, carbonization may be carried on at lower temperatures and the properties of the resultant bond modified. For instance, it has been found that the addition of small quantities of lime or alum to the mixture tends to promote carbonization at lower temperatures than when they are omitted. Oxalic acid, boric acid, chrome alum, tannic acid, lead acetate, copper acetate and urea each produce somewhat tougher bonds when mixed with a starch binder solution than are produced by the starch alone.

In the preparation of filter diaphragms from silicate fibers considerable trouble has been experienced in obtaining the desired degree of porosity. Not only is it difficult to weave and felt these fibers into a material having the exact porosity desired but these operations generally necessitate the use of binders and sizes which tend to wash from the material after it is in use thus gradually increasing the porosity. If, however, the binder or size be carbonized in accordance with the present invention, a product is obtained which will retain uniform physical characteristics throughout its use. Not only can the porosity of a fabric be stabilized in this manner but it may also be regulated. This may be accomplished by treating the fabric to a greater or less extent with a carbonizable substance prior to heating. Thus any desired amount of an insoluble filler may be introduced into the fabric and made a part thereof during the carbonization of the binder or sizing material. If desired a small quantity of inert inorganic material such as clay or bentonite may be added to the treating solution to further fill the pores of the fabric and reduce and regulate its porosity.

While I have described various specific modifications of my invention, these are to be considered as merely illustrative and further modification is to be permitted within the scope of the appended claims.

I claim:

1. The method of forming a porous fibrous mass which comprises coating a plurality of silicate fibers with an organic adhesive which will form a carbonaceous residue upon heating and containing an agent tending to promote carbonization of the adhesive, causing said fibers to become adhesively attached to one another by means of said coating and reducing said adhesive to an inert carbonaceous residue by moderately heating said bonded mass of fibers in the absence of oxygen while maintaining the adherence of said adhesive with said fibers.

2. The method of bonding silicate fibers which comprises coating a mass of such fibers with a thin layer of an organic adhesive which will form a carbonaceous residue upon heating and containing a substance tending to promote carbonization, causing said coated fibers to adhere to one another and heating said fibers and adhesive to a temperature of from 300° to 350° C. in the absence of oxygen.

JAMES FRANKLIN HYDE.